(12) United States Patent
Hu et al.

(10) Patent No.: US 11,775,035 B2
(45) Date of Patent: *Oct. 3, 2023

(54) MULTI-PHASE POWER SUPPLY REGULATOR AND TEMPERATURE BALANCE CONTROL METHOD THEREOF

(71) Applicant: Shanghai Bright Power Semiconductor Co., Ltd., Shanghai (CN)

(72) Inventors: Li-Qiang Hu, Shanghai (CN); Shun-Gen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 77 days.

This patent is subject to a terminal disclaimer.

(21) Appl. No.: 17/525,470

(22) Filed: Nov. 12, 2021

(65) Prior Publication Data

US 2022/0197354 A1    Jun. 23, 2022

(30) Foreign Application Priority Data

Dec. 17, 2020   (CN) .......................... 202011496835.2

(51) Int. Cl.
  *G06F 1/00*    (2006.01)
  *G06F 1/20*    (2006.01)
  *G06F 1/3206*  (2019.01)

(52) U.S. Cl.
  CPC ............ *G06F 1/206* (2013.01); *G06F 1/3206* (2013.01)

(58) Field of Classification Search
  None
  See application file for complete search history.

(56) References Cited

U.S. PATENT DOCUMENTS

2011/0051479 A1*  3/2011  Breen ................. H02M 3/1584
                                                             363/148
2019/0165679 A1*  5/2019  Mirjafari ............. H02M 3/1584

* cited by examiner

*Primary Examiner* — Nitin C Patel
(74) *Attorney, Agent, or Firm* — MUNCY, GEISSLER, OLDS & LOWE, P.C.

(57) ABSTRACT

The invention relates to a multi-phase power supply regulator and a temperature balance control method thereof. The method comprises: providing a multi-phase power supply regulator which includes a controller and a plurality of power stages, transmitting a plurality of control signals to the plurality of power stages respectively by the controller. Each of the plurality of power stages includes a temperature sampling unit, wherein outputs of the temperature sampling units are connected in parallel and the plurality of power stages outputs a temperature detection signal. The invention determines one of the plurality of power stages comprising highest temperature by sequentially adjusting the control signals, the temperature of the power stage is reduced, and the temperatures of the multi-phase power supply regulator are balanced.

10 Claims, 5 Drawing Sheets

MULTI-PHASE POWER SUPPLY REGULATOR AND TEMPERATURE BALANCE CONTROL METHOD THEREOF

FIELD OF THE INVENTION

The invention relates to a power supply regulator, in particular to a multi-phase power supply regulator and a temperature balance control method thereof.

BACKGROUND OF THE INVENTION

As semiconductor technology continues to evolve, for example, computers and peripheral digital products have become increasingly improved. In the application of computers and peripheral digital products, due to the rapid development of semiconductor technology, more diversified requirements of power supply for integrated circuit are made. Voltage regulators of various combinations, such as step-up converters, step-down converters and so on, are used to meet different power supply requirements of various integrated circuits, and become one of the important factors whether various diversified digital products can be provided.

In various voltage regulation circuits, multi-phase power supply regulators have good performance in high current or high power applications. However, due to the inconsistency of the layout and design of the multi-phase power supply, the temperature inconsistency of each phase is caused, that is, some phases are low in temperature and some phases are high in temperature, so that the reliability of the multi-phase power supply is reduced and the power output capacity of the multi-phase power supply is limited. Therefore, the temperature monitoring of a multi-phase power supply regulator is an urgent problem to be solved.

SUMMARY OF THE INVENTION

The invention provides a method of temperature balance control of a multi-phase power supply regulator, which can effectively achieve temperature balance.

The invention further provides a multi-phase power supply regulator which can effectively achieve temperature balance.

Other objects and advantages of the invention can be further understood from the technical features provided in the invention.

The invention provides a method of temperature balance control of a multi-phase power supply regulator, comprising the following steps of:

Step 1a: providing a multi-phase power supply regulator which includes a controller and a plurality of power stages, wherein a plurality of control signals are transmitted by the controller to the plurality of power stages respectively, each of the plurality of power stages includes a temperature sampling unit, outputs of the temperature sampling units are connected in parallel, which output a temperature detection signal;

Step 1b: sequentially adjusting the plurality of control signals of the plurality of power stages by the controller, and determining the temperature detection signal by the controller.

Step 1c: labeling one of the plurality of power stages correspondingly adjusted as a high-temperature power stage or a low-temperature power stage if the temperature detection signal changes along with one of the plurality of control signals.

In an embodiment of the invention, after step 1c, the method further comprises step 1d: adjusting the control signal corresponding to the high-temperature power stage or the low-temperature power stage by the controller to change the temperature of the high-temperature power stage or the low-temperature power stage, and returning to step 1b.

In an embodiment of the invention, the plurality of control signals are pulse width modulation signals, and the controller adjusts a pulse width of one of the plurality of control signals.

In an embodiment of the present invention, step 1b further includes increasing the pulse width of one of the plurality of control signals corresponding to one of the plurality of power stages and determining whether the temperature detection signal is increased by the controller.

In an embodiment of the present invention, step 1b further includes reducing the pulse width of one of the plurality of control signals corresponding to one of the plurality of power stages and determining whether the temperature detection signal is reduced by the controller.

In an embodiment of the present invention, step 1d further includes reducing the pulse width of one of the plurality of control signals corresponding to the high-temperature power stage by the controller, and returning to step 1b.

The multi-phase power supply regulator of the invention comprises a controller and a plurality of power stages. The controller transmits a plurality of control signals to the plurality of power stages respectively. Each of the plurality of power stages comprises a temperature sampling unit, and outputs of the temperature sampling units are connected in parallel and output a temperature detection signal. The temperature detection signal changes along with adjustment of at least one of the plurality of control signals corresponding to at least one of the plurality of power stages.

In an embodiment of the invention, each of the plurality of temperature sampling units includes a temperature sampling circuit, a pull-up circuit and a pull-down circuit, the pull-up circuit and the pull-down circuit coupled to the temperature sampling circuit, and the pull-up circuit and the pull-down circuit connected to the output of the temperature sampling unit.

In an embodiment of the present invention, the multi-phase power supply regulator is configured to perform the steps of:

Step 2a: sequentially adjusting the plurality of control signals of the plurality of power stages by the controller, and determining the temperature detection signal output from one of the plurality of power stages by the controller.

Step 2b: if the temperature detection signal changes along with one of the plurality of control signal, labeling one of the plurality of power stages correspondingly adjusted as a high-temperature power stage or a low-temperature power stage.

Step 2c: adjusting the control signal corresponding to the high-temperature power stage or the low-temperature power stage by the controller to change the temperature of the high-temperature power stage or the low-temperature power stage, and returning to step 2a.

In an embodiment of the invention, the plurality of control signals are pulse width modulation signals, and the controller adjusts a pulse width of one of the plurality of control signals.

Accordingly, the multi-phase power supply regulator and the temperature balance control method thereof provided of the invention are able to label the power stage with the highest temperature power stage or the low-temperature power stage by detecting whether the temperature detection signal output by the temperature detection circuit changes along with the control signal. A plurality of power stages can effectively achieve temperature equalization, and the reliability of the multi-phase power supply regulator is greatly improved. The multi-phase power supply regulator of the invention can fully utilize the power output capability of the multi-phase power supply and simultaneously improve the reliability of the multi-phase power supply.

DETAILED DESCRIPTION OF THE PREFERRED EMBODIMENTS

The foregoing and other technical contents, features and effects of the invention will be apparent from the following detailed description of an embodiment with reference to the accompanying drawings.

When an element is referred to as being "connected" or "coupled" to another element, the element may be connected or coupled to the other element directly or through intervening elements. Additionally, it should be understood that the order of description of the various embodiments should not be construed to imply that the operations or steps must be order dependent, and that alternative embodiments may perform the steps, operations, methods, etc. in an order other than that described herein.

Figure 1:
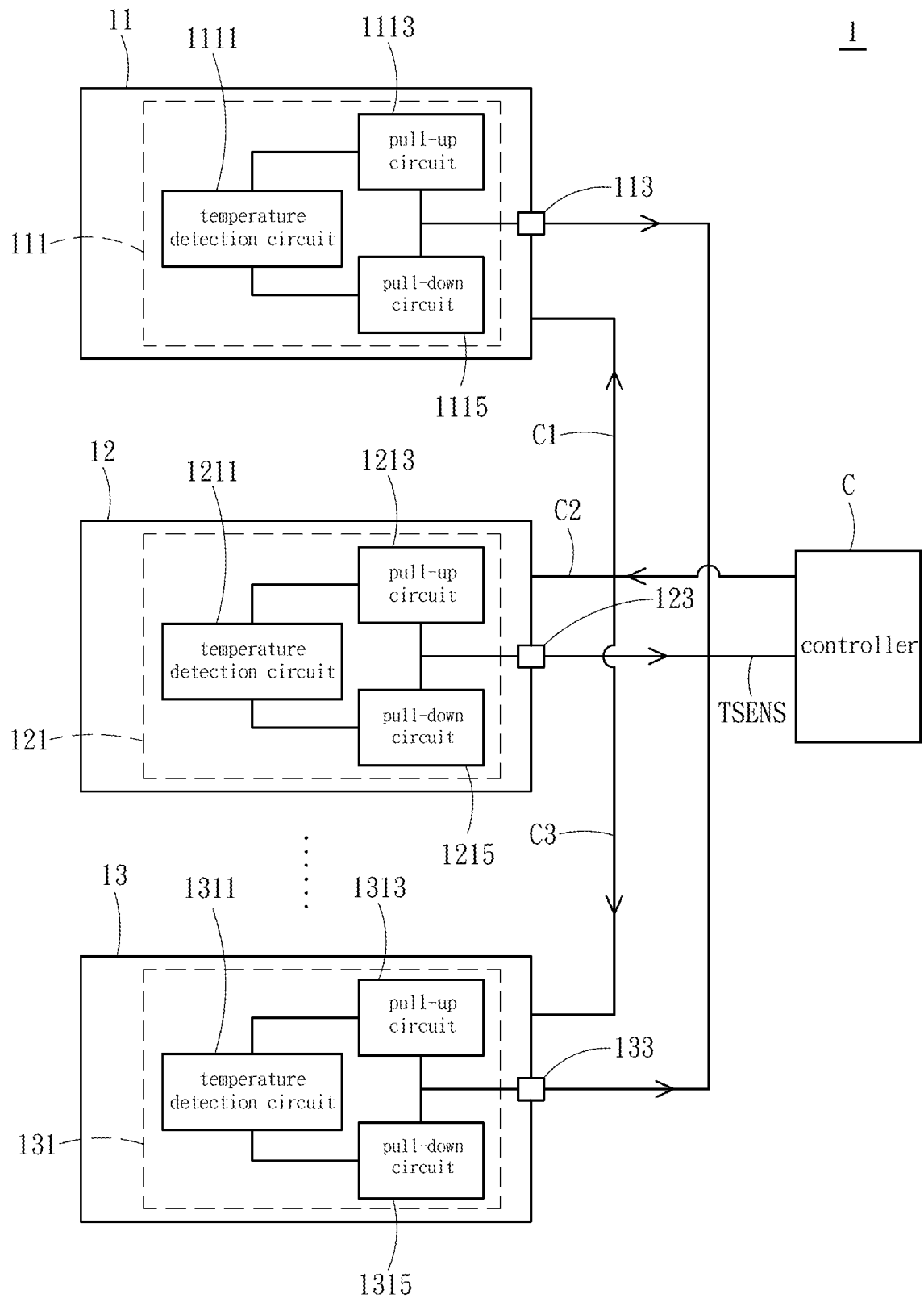
FIG. 1 is a schematic diagram of a multi-phase power supply regulator according to an embodiment of the invention.

With reference to FIG. 1, there is shown a schematic diagram of a multi-phase power supply regulator 1 according to an embodiment of the present invention. The multi-phase power supply regulator 1 includes a controller C and a plurality of power stages 11, 12, 13. The invention is not limited regarding the amount of power stages included in the multi-phase power supply regulator. In the embodiment, the multi-phase power supply regulator 1 includes three power stages 11, 12, 13. The controller C transmits a plurality of control signals C1, C2, C3 to the plurality of power stages 11, 12, 13, respectively. Each of the plurality of power stages 11 (or 12, 13) includes a temperature sampling unit 111 (or 121, 131). Outputs 113, 123, 133 of the temperature sampling units 111, 121, 131 of the plurality of power stages 11, 12, 13 are connected in parallel to output a temperature detection signal TSENS.

In the embodiment, each of the temperature sampling units 111 (or 121, 131) includes a temperature detection circuit 1111 (or 1211, 1311). Each of temperature sampling unit 111 (or 121, 131) includes a pull-up circuit 1113 (or 1213, 1313) and a pull-down circuit 1115 (or 1215, 1315). The pull-up circuit 1113 and the pull-down circuit 1115 are coupled to the temperature detection circuit 1111 and are connected to the output 113; the pull-up circuit 1213 and the pull-down circuit 1215 are coupled to the temperature detection circuit 1211 and are connected to the output 123; the pull-up circuit 1313 and the pull-down circuit 1315 are coupled to the temperature detection circuit 1311 and are connected to the output 133. The pull-up circuits 1113, 1213, 1313 may be implemented in a manner commonly known in the art, such as a circuit composed of a field effect transistor and a capacitor connected across the source and ground terminals of the field effect transistor. The pull-down circuits 1115, 1215, 1315 may be implemented in a manner commonly known in the art, such as a circuit composed of a field effect transistor and a capacitor connected across the source and ground terminals of the field effect transistor. In an embodiment, the pull-up circuits 1113, 1213, 1313 have strong pull-up capabilities, and the pull-down circuits 1115, 1215, 1315 have weak pull-down capabilities, whereby the outputs 113, 123, 133 of the temperature sampling units 111, 121, 131 are directly connected in parallel to output the temperature detection signal TSENS corresponding to the highest temperature among the plurality of power stages 11, 12, 13.

Figure 2:
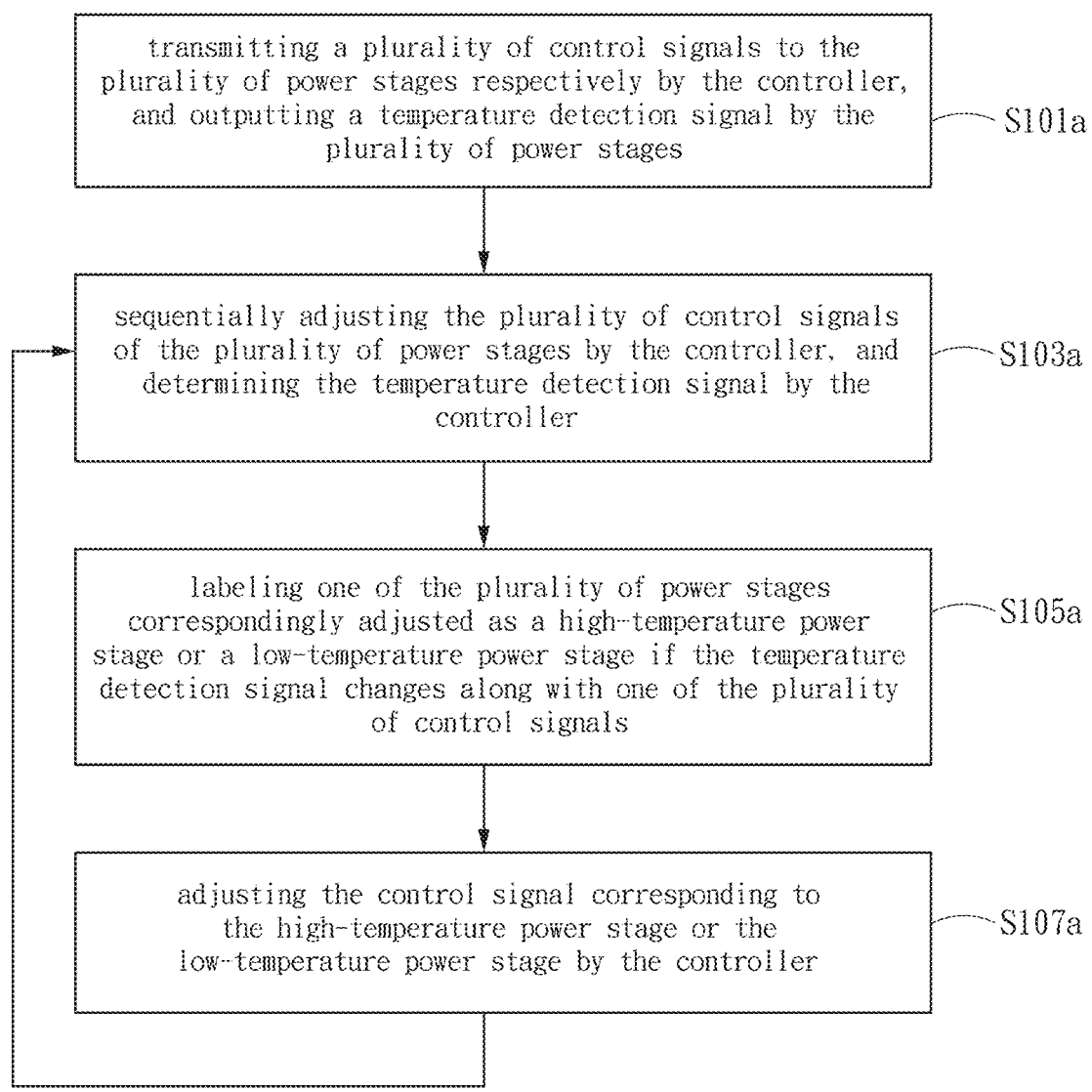
FIG. 2 is a flowchart of a temperature balance control method according to an embodiment of the invention.

Please refer to FIG. 2, which is a flowchart of a temperature balance control method 100 of a multi-phase power supply regulator 1 according to an embodiment of the invention. In step S101a, the multi-phase power supply regulator 1 shown in FIG. 1 is provided. The multi-phase power supply regulator 1 includes the controller C and the plurality of power stages 11, 12, 13. Each of the plurality of power stages 11 (or 12, 13) includes the temperature sampling unit 111 (or 121, 131). The outputs 113, 123, 133 of the temperature sampling units 111, 121, 131 are connected in parallel and output a temperature detection signal TSENS. The controller C transmits the plurality of control signals C1, C2, C3 to the plurality of power stage 11, 12, 13, respectively. Next, in step S103a, the controller C sequentially adjusts the plurality of control signals C1, C2, C3 of the plurality of power stages 11, 12, 13. In other words, only the control signal of one of the plurality of single power stages is adjusted at a time. For example, when the control signal C1 of the power stage 11 is adjusted firstly, the control signals C2 and C3 of the power stages 12 and 13 are not adjusted at this moment. The controller C determines whether the output temperature detection signal TSENS changes or not.

Next, in step S105a, one of the plurality of power stages correspondingly adjusted as a high-temperature power stage or a low-temperature power stage is labeled if the temperature detection signal TSENS changes along with the one of the plurality of control signals. For example, the control signal C1 of the power stage 11 is adjusted firstly while the control signals C2 and C3 of the power stages 12 and 13 are not adjusted at this moment, and it is determined if the temperature detection signal TSENS output by the power stage 11 changes along with the control signal C1. Then, in step S107a, the control signal C2 of the power stage 12 is adjusted while the control signals C1 and C3 of the power stages 11 and 13 are not adjusted at this moment, and it is determined if the temperature detection signal TSENS output by the power stage 12 changes along with the control signal C2. Then, the control signal C3 of the power stage 13 is adjusted while the control signals C1 and C2 of the power stages 11 and 12 are not adjusted at this moment, and it is determined if the temperature detection signal TSENS output by the power stage 13 changes along with the control signal C3. Accordingly, the power stage 11 is labeled as a high-temperature power stage if the temperature detection signal TSENS changes along with the control signal C1. The labeling process may be performed by the controller C via storing a number corresponding to the high-temperature power stage, or by the corresponding high-temperature power stage itself, just to name a few examples. In another embodiment, the high- or low-temperature power stage does not require to be labeled by a separate operation, but can be labeled in a subsequent step of adjusting the control signal of the high- or low-temperature power stage.

Figure 3:
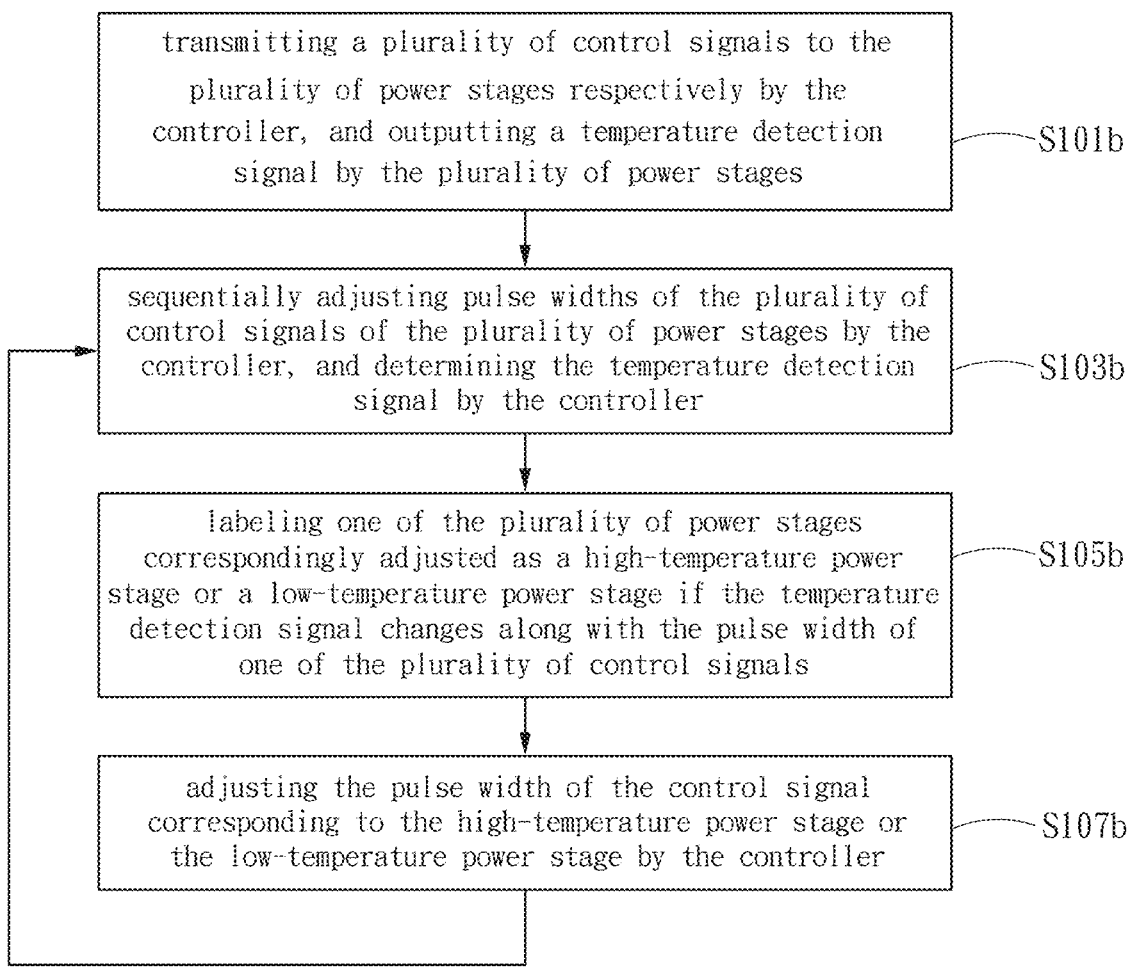
FIG. 3 is a flowchart of a temperature balance control method according to another embodiment of the invention.
Figure 4:
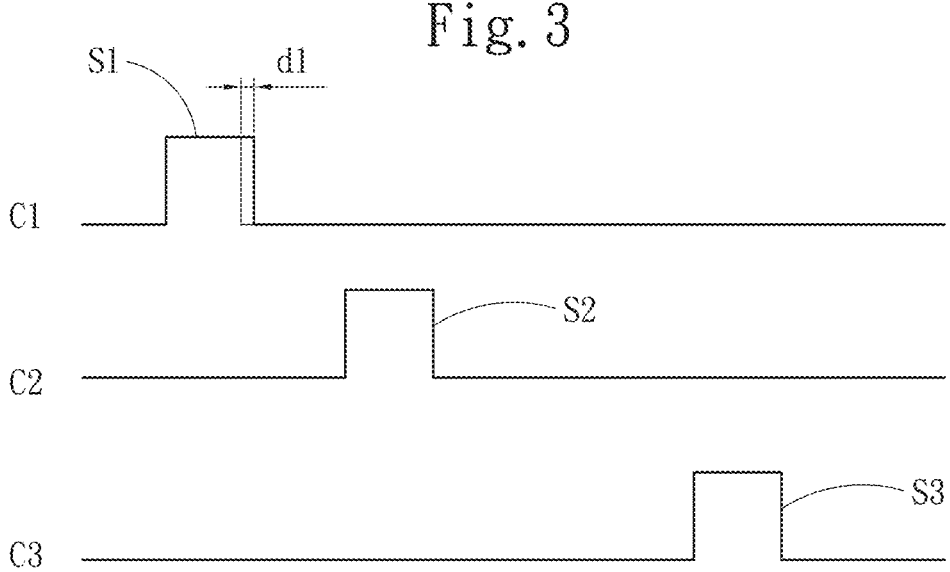
FIG. 4 is a schematic diagram of a plurality of control signals of a temperature balance control method according to another embodiment of the invention.

Please refer to FIGS. 3 and 4. FIG. 3 is a flow chart of a temperature balance control method 200 according to another embodiment of the present invention, and FIG. 4 is a schematic diagram of the plurality of control signals of a corresponding temperature balance control method 200. In the embodiment, the plurality of control signals C1, C2, C3 of the plurality of power stages 11, 12, 13 are pulse width modulation signals (PWM). The plurality of control signals C1, C2, C3 are provided with pulses S1, S2, S3, respectively. In FIG. 3, Step S101$b$ is the same as step S101$a$ in FIG. 2. In step S103$b$, the controller C sequentially adjusts the pulse widths of the pulses S1, S2 and S3 of the plurality of control signals C1, C2, C3, and the controller C determines whether the temperature detection signal TSENS changes along with the control signals C1, C2, C3. In an embodiment of the invention, the control signal may be adjusted by increasing the pulse width or by decreasing the pulse width. FIG. 4 shows that the controller C decreases the pulse width of the pulse S1 by a period d1, wherein the decrease on the pulse width may correspond to the controller C adjusting the pulse widths of the plurality of control signals C1, C2, C3 in step S103$b$, or may correspond to step S107$b$ described below.

In step S105$b$, indicating that the power stage 11 has the highest temperature among the plurality of power stages 11, 12, 13 if the temperature detection signal TSENS changes along with the change of the width of the pulse S1. In this embodiment, the power stage 11 is labeled as the high-temperature power stage as an example.

Next, in step S107$b$, the controller C decreases the pulse width of the control signal corresponding to the high-temperature power stage. For example, the controller C decreases the pulse width of the pulse S1 so that the temperature of the high-temperature power stage decreases, thereby improving the temperature balance condition in the multi-phase power supply. Subsequently, returning to step S103$b$, continuously adjusting the plurality of control signals of the plurality of power stages sequentially, and the temperature detection signal TSENS is detected.

In step S105$b$, indicating that the temperature of the power stage 11 corresponding to the control signal C1 is not the highest if the temperature detection signal TSENS has not changed. At this moment, the controller C restores the pulse width of the pulse S1 of the control signal C1 to the original pulse width, i.e. increasing the pulse width. Then the control signals of the other power stages are adjusted sequentially until the power stage with the highest temperature is found and the control signals are adjusted to reduce the temperature of the high-temperature power stage.

In other embodiments of the invention, width adjustment values of the pulses S1, S2, S3 may be different. When the temperature is higher, larger pulse width adjustment can be made. Therefore, through the temperature balance control method 200, the temperatures of the plurality of power stages 11, 12, 13 can be balanced effectively, and the reliability of the multi-phase power supply regulator 1 is greatly improved.

Figure 5:
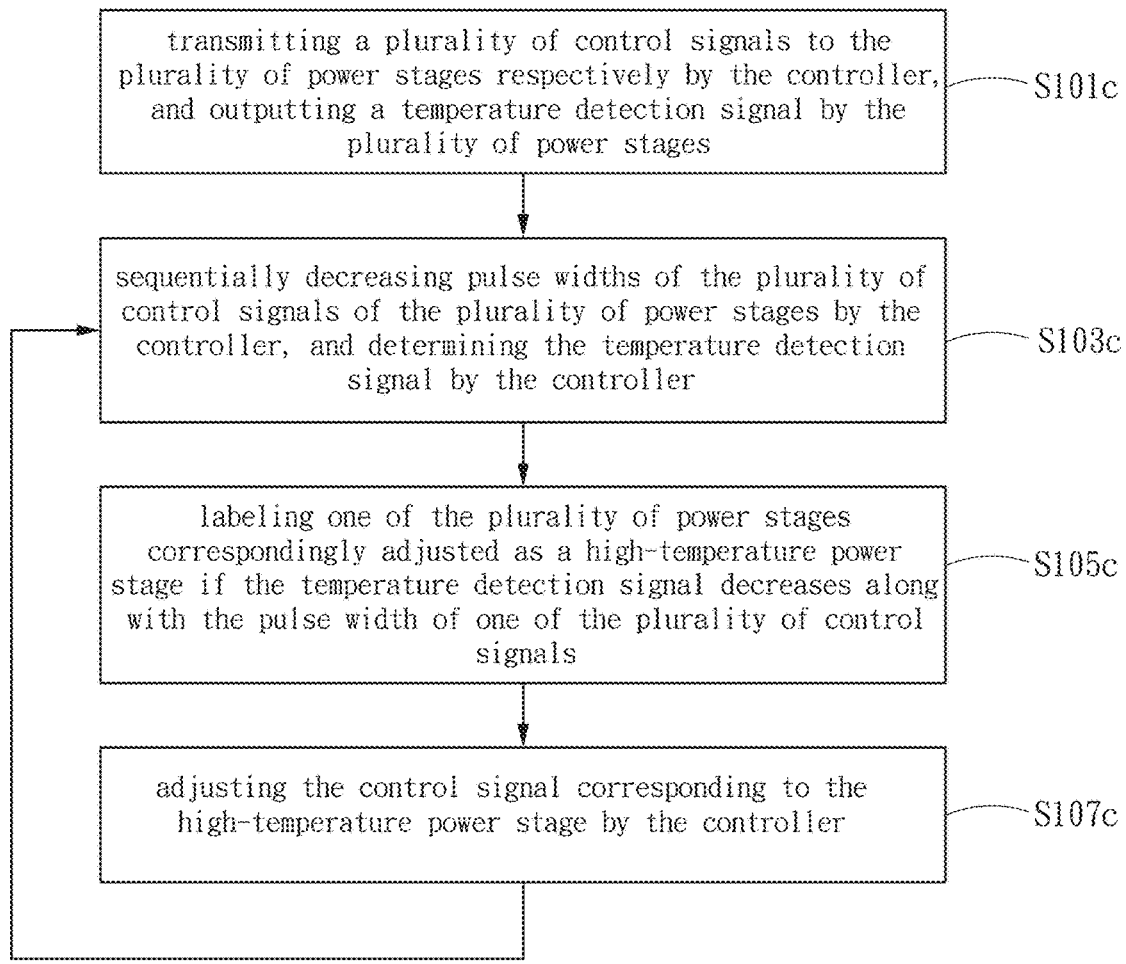
FIG. 5 is a flowchart of a temperature balance control method according to another embodiment of the invention.
Figure 6:
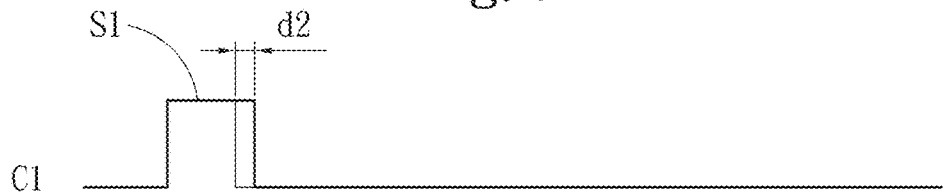
FIG. 6 is a schematic diagram of a plurality of control signals of a temperature balance control method according to another embodiment of the invention.
Figure 6:
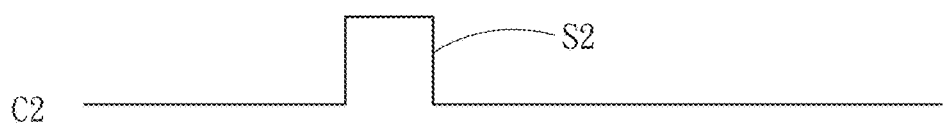

Please refer to FIG. 5 and FIG. 6. FIG. 5 is a flow chart of a temperature balance control method 300 according to another embodiment of the present invention, and FIG. 6 is a schematic diagram of the plurality of control signals of a corresponding temperature balance control method 300. Step S101$c$ is the same as step S101$a$ in FIG. 2. In step S103$c$, the controller C sequentially decreases the pulse widths of the plurality of control signals C1, C2, C3 of the plurality of power stages 11, 12, 13, and the controller C determines whether the temperature detection signal TSENS changes along with the plurality of control signals C1, C2, C3. In one example shown in FIG. 6, the control signal C1 is adjusted by decreasing the pulse width of the pulse S1 by a period d2, wherein the decrease of the pulse width may correspond to the controller C adjusting the pulse widths of the plurality of control signals C1, C2, C3 in step S103$c$, or may correspond to step S107$c$ described below.

In step S105$c$, the power stage 11 is labeled as a high-temperature power stage if the temperature detection signal TSENS decreases along with the control signal C1. Next, in step S107$c$, the controller C adjusts the control signal corresponding to the high-temperature power stage so that the temperature of the high-temperature power stage decreases, and returns to step S103$c$. In the embodiment, as shown in FIG. 5 and FIG. 6, the control signal C1 is set to remained with a smaller pulse width.

Figure 7:
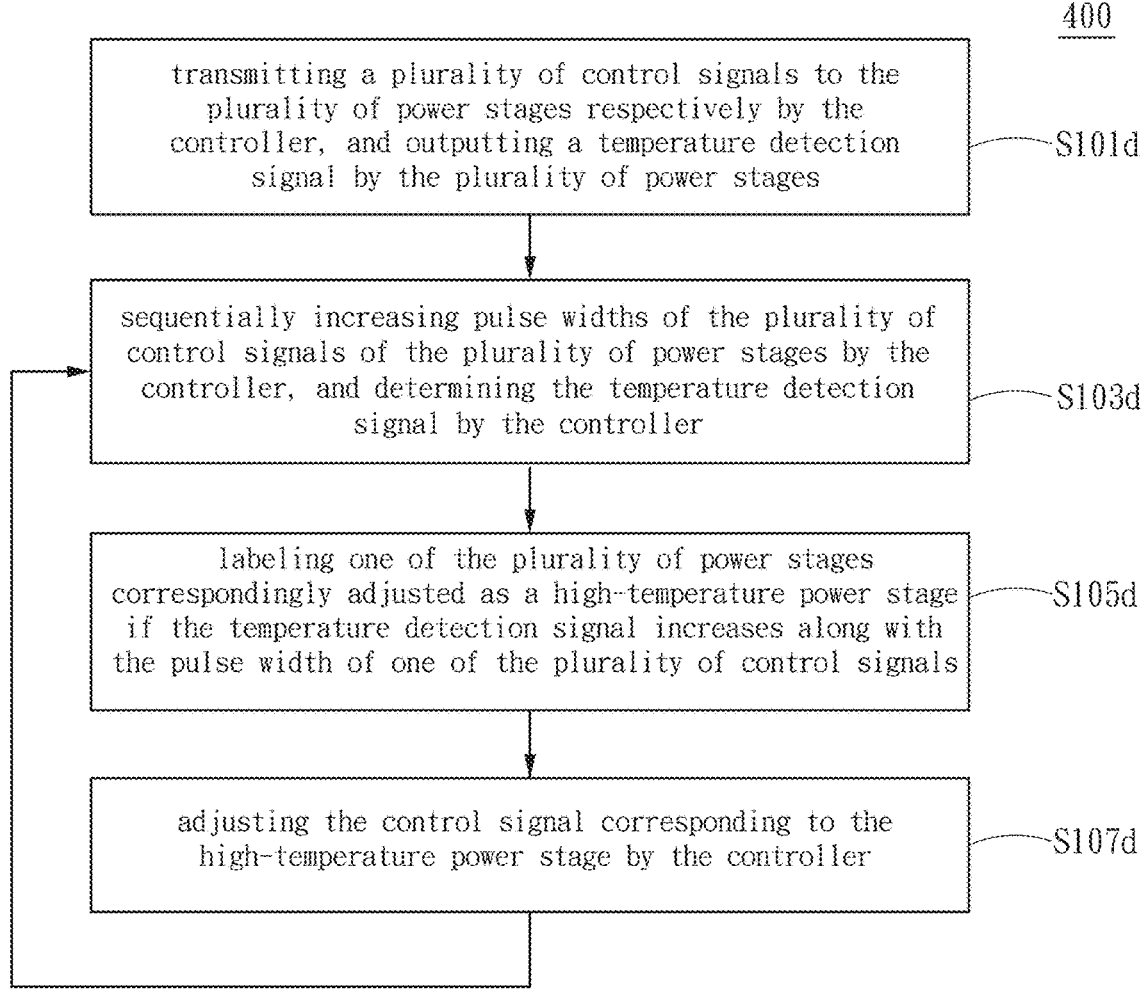
FIG. 7 is a flowchart of a temperature balance control method according to another embodiment of the invention.
Figure 8:
FIG. 8 is a schematic diagram of a plurality of control signals of a temperature balance control method according to another embodiment of the invention.
Figure 8:
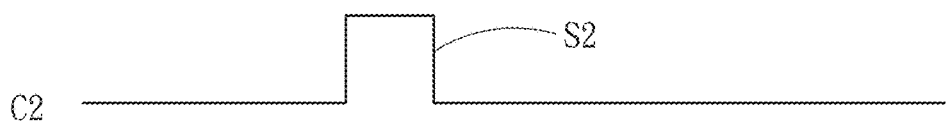
Figure 8:

In another embodiment, please refer to FIG. 7 and FIG. 8. FIG. 7 is a flow chart of a temperature balance control method 400 according to another embodiment of the present invention, and FIG. 8 is a schematic diagram of the plurality of control signals of a corresponding temperature balance control method 400. Step S101$d$ is the same as step S101$a$ in FIG. 2. In step S103$d$, the controller C sequentially increases the pulse widths of the plurality of control signals C1, C2, C3 of the plurality of power stages 11, 12, 13, and the controller C determines whether the temperature detection signal TSENS changes along with the plurality of control signals C1, C2, C3. In the embodiment, the control signal C1 is adjusted by increasing the pulse width of the pulse S1 by a period d3 as shown in FIG. 8, wherein the increase of the pulse width may correspond to the controller C adjusting the pulse widths of the plurality of control signals C1, C2, C3 in step S103$d$, or may correspond to step S107$d$ described below.

In step S105$d$, the power stage S1 correspondingly adjusted is labeled as a high-temperature power stage if the temperature detection signal TSENS increases along with the control signal. Next, in step S107$d$, the controller C adjusts the control signal corresponding to the high-temperature power stage so that the temperature of the high-temperature power stage decreases, and returns to step S103$d$.

In the above-mentioned embodiments of the invention, adjustment values of the pulse widths d1, d2, d3 may be different and are not limited to the Figures. Furthermore, the adjustment values of the pulse widths of the plurality of control signals C1, C2, C3 may also be different.

Therefore, through the temperature balance control method of the invention, the temperatures of the plurality of power stages 11, 12, 13 are balanced, and the reliability of the multi-phase power supply regulator 1 is greatly improved.

In summary, according to the multi-phase power supply regulator and the temperature balance control method thereof provided by the invention, by determining whether the output temperature detection signal changes along with the control signal or not, the power stage with the highest temperature can be labeled. The control signal of the high-temperature power stage is adjusted correspondingly, so that temperatures of the plurality of power stages are effectively balanced and the reliability of the multi-phase power supply regulator is greatly improved. The multi-phase power supply regulator of the invention can also improve the reliability of the multi-phase power supply and the output capability of the multi-phase power supply.

What is claimed is:

1. A method of temperature balance control of a multi-phase power supply regulator, comprising the following steps of:
   step 1a: providing a multi-phase power supply regulator which includes a controller and a plurality of power stages, wherein a plurality of control signals are transmitted from the controller to the plurality of power stages respectively, each of the plurality of power stages includes a temperature sampling unit, and outputs of the temperature sampling units are connected in parallel, which output a temperature detection signal;
   step 1b: sequentially adjusting the plurality of control signals of the plurality of power stages by the controller, and determining the temperature detection signal by the controller; and
   step 1c: labeling one of the plurality of power stages correspondingly adjusted as a high-temperature power stage or a low-temperature power stage if the temperature detection signal changes along with one of the plurality of control signals.

2. The method of temperature balance control according to claim 1, wherein after step 1c, the method further comprises the step of:
   step 1d: adjusting the control signal corresponding to the high-temperature power stage or the low-temperature power stage by the controller to change the temperature of the high-temperature power stage or the low-temperature power stage, and returning to step 1b.

3. The method of temperature balance control according to claim 1, wherein the plurality of control signals are pulse width modulation signals, and the controller adjusts a pulse width of one of the plurality of control signals.

4. The method of temperature balance control according to claim 2, wherein the plurality of control signals are pulse width modulation signals, and the controller adjusts a pulse width of one of the plurality of control signals.

5. The method of temperature balance control according to claim 3, wherein step 1b further includes increasing the pulse width of one of the plurality of control signals corresponding to one of the plurality of power stages and determining whether the temperature detection signal is increased by the controller.

6. The method of temperature balance control according to claim 3, wherein step 1b further includes reducing the pulse width of one of the plurality of control signals corresponding to one of the plurality of power stages and determining whether the temperature detection signal is reduced by the controller.

7. The method of temperature balance control according to claim 4, wherein step 1d further includes reducing the pulse width of one of the plurality of control signals corresponding to the high-temperature power stage by the controller, and returning to step 1b.

8. A multi-phase power supply regulator, comprising:
   a controller; and
   a plurality of power stages, wherein the controller transmits a plurality of control signals to the plurality of power stages respectively;
   wherein each of the plurality of power stages comprises a temperature sampling unit, and outputs of the temperature sampling units are connected in parallel, which output a temperature detection signal;
   wherein the temperature detection signal changes along with adjustment of at least one of the plurality of control signals corresponding to at least one of the plurality of power stages; and
   wherein each of the plurality of temperature sampling units includes a temperature sampling circuit, a pull-up circuit and a pull-down circuit, the pull-up circuit and the pull-down circuit coupled to the temperature sampling circuit, and the pull-up circuit and the pull-down circuit connected to the output of the temperature sampling unit.

9. The multi-phase power supply regulator according to claim 8, wherein the multi-phase power supply regulator is configured to perform the steps of:
   step 2a: sequentially adjusting the plurality of control signals of the plurality of power stages by the controller, and determining the temperature detection signal output from one of the plurality of power stages by the controller; and
   step 2b: if the temperature detection signal changes along with one of the plurality of control signals, labeling one of the plurality of power stages correspondingly adjusted as a high-temperature power stage or a low-temperature power stage; and
   step 2c: adjusting the control signal corresponding to the high-temperature power stage or the low-temperature power stage by the controller to change the temperature of the high-temperature power stage or the low-temperature power stage, and returning to step 2a.

10. The multi-phase power supply regulator according to claim 8 wherein the plurality of control signals are pulse width modulation signals, and the controller adjusts a pulse width of one of the plurality of control signals.

* * * * *